UNITED STATES PATENT OFFICE.

JOSEPH WILKINS, OF BALTIMORE, MARYLAND.

IMPROVEMENT IN SEPARATING ANIMAL FROM VEGETABLE FIBER.

Specification forming part of Letters Patent No. 203,231, dated April 30, 1878; application filed April 23, 1878.

*To all whom it may concern:*

Be it known that I, JOSEPH WILKINS, of Baltimore city, State of Maryland, have invented certain new and useful Improvements in Processes for Separating Animal from Vegetable Fiber; and I hereby declare the same to be fully, clearly, and exactly described, as follows:

This invention relates to that class of processes for separating animal fiber from mixed fabrics depending upon the disintegration of the vegetable fiber by treatment with acids, sulphuric acid being usually employed.

In carrying out these processes it has been customary to boil the rags in the acid solution, rinse, and agitate for the separation of the vegetable fiber, which is disintegrated during the process of boiling. While these processes are thoroughly efficient, so far as the mere separation of the two kinds of fiber is concerned, the wool so reclaimed is generally greatly inferior to the natural article, being rendered somewhat harsh and brittle by the chemical treatment. In order to obviate these results, I treat the rags as hereinafter described, the said process resulting in the recovery of the wool in a condition, in respect to strength, softness, and pliability, vastly superior to the product of the chemical processes referred to.

In carrying out the said process, I prepare a bath of sulphuric acid, diluted to about from 8° to 12° Baumé at 62° Fahrenheit, and immerse the rags therein until they are thoroughly saturated with the solution. I then remove them, and separate the excess of the acid solution by wringing or treatment in an ordinary centrifugal machine. The rags are then subjected to dry heat until thoroughly dry, the temperature not, however, being allowed to exceed, say, 240° Fahrenheit. They are then placed in a tank provided with a perforated steam-coil, and filled with pure water, which is made to boil, thereby eliminating the last traces of acid. Finally, the rags are placed in a tank containing water, in which they are beaten and agitated, in order to remove the disintegrated and loosened particles of cotton fiber, the wool or animal fiber being then dried, carded, and sent into commerce.

The chief feature of my invention consists in submitting the rags, while moistened with the acid solution, to dry heat. The action of the acid in destroying the cotton or vegetable fiber is due to its affinity for water, an affinity which is enhanced by elevation of temperature and concentration of the acid solution. The action of the acid consists in the elimination from the cellulose of the elements of water, hydrogen and oxygen, resulting in a disintegration of the fiber.

It is out of the question to treat the mixed fabric with strong acid, as such would exert, even in the cold, a deleterious, if not destructive, action on the animal fiber of the same.

By immersing the fabric in dilute acid cold, no action takes place upon either fiber; but the gradual concentration of the adhering solution, in being evaporated to dryness, as described, results in a thorough and complete disintegration of the vegetable fiber without any action whatever upon the wool.

Obviously the process involves but a minimum expenditure for plant, and little or no waste of material.

Having thus described my invention, what I claim as new, and desire to secure by Letters Patent, is—

1. In a process for separating animal from vegetable fiber in mixed fabrics, submitting the same, while moistened with a dilute acid, to dry heat, so as to disintegrate the vegetable fiber, substantially as described.

2. The process herein described for separating animal from vegetable fiber in mixed fabrics, consisting in moistening the same with dilute acid, subjecting to dry heat, and agitating, as described.

JOS. WILKINS.

Witnesses:
R. D. WILLIAMS,
DAVID G. WEEMS.